US010665899B2

(12) United States Patent
Moganty et al.

(10) Patent No.: US 10,665,899 B2
(45) Date of Patent: May 26, 2020

(54) PHOSPHORUS CONTAINING ELECTROLYTES

(71) Applicant: NOHMs Technologies, Inc., Rochester, NY (US)

(72) Inventors: Surya Moganty, Henrietta, NY (US); Luigi Abbate, Rochester, NY (US); Aditya Raghunathan, Rochester, NY (US); John Sinicropi, Rochester, NY (US); Gabriel Torres, Rochester, NY (US); Yue Wu, Rochester, NY (US)

(73) Assignee: NOHMS Technologies, Inc., Rochester, NY (US)

( * ) Notice: Subject to any disclaimer, the term of this patent is extended or adjusted under 35 U.S.C. 154(b) by 5 days.

(21) Appl. No.: 16/038,046

(22) Filed: Jul. 17, 2018

(65) Prior Publication Data

US 2019/0020069 A1 Jan. 17, 2019

Related U.S. Application Data

(60) Provisional application No. 62/533,277, filed on Jul. 17, 2017.

(51) Int. Cl.
*H01M 10/0569* (2010.01)
*H01M 10/0567* (2010.01)
*H01M 6/16* (2006.01)
*H01M 10/42* (2006.01)
*H01M 10/052* (2010.01)

(52) U.S. Cl.
CPC ....... *H01M 10/0569* (2013.01); *H01M 6/164* (2013.01); *H01M 6/168* (2013.01); *H01M 10/052* (2013.01); *H01M 10/0567* (2013.01); *H01M 10/4235* (2013.01); *H01M 2300/0037* (2013.01)

(58) Field of Classification Search
CPC .................................. H01M 10/0569
USPC ........................................... 429/304
See application file for complete search history.

(56) References Cited

U.S. PATENT DOCUMENTS

| 2,922,738 | A | 1/1960 | McDermott et al. |
| 3,308,208 | A | 3/1967 | Seil et al. |
| 3,318,810 | A | 5/1967 | McGrath et al. |
| 3,384,685 | A | 5/1968 | Boschan et al. |
| 3,384,686 | A | 5/1968 | Boschan et al. |
| 3,661,843 | A | 5/1972 | Hechenbleikner et al. |

(Continued)

FOREIGN PATENT DOCUMENTS

| CN | 1635063 A | 7/2005 |
| CN | 101037388 A | 9/2007 |

(Continued)

OTHER PUBLICATIONS

PCT International Search Report, Form PCT/ISA/210, International application No. PCT/US18/042543, International filing date Jul. 17, 2018, dated Sep. 27, 2018.

(Continued)

*Primary Examiner* — James M Erwin
(74) *Attorney, Agent, or Firm* — Bond, Schoeneck & King, PLLC; Joseph Noto

(57) ABSTRACT

The present disclosure is directed to phosphorus based thermal runaway inhibiting (TRI) materials, the synthesis thereof and an electrochemical cell electrolyte containing the phosphorus based materials.

22 Claims, 3 Drawing Sheets

(56) References Cited

U.S. PATENT DOCUMENTS

| | | |
|---|---|---|
| 4,000,101 A | 12/1976 | Mc Nally |
| 5,550,276 A | 8/1996 | Wirth et al. |
| 5,580,684 A | 12/1996 | Yokoyama et al. |
| 5,830,600 A | 11/1998 | Narang et al. |
| 6,040,091 A | 3/2000 | Sugita et al. |
| 6,200,701 B1 | 3/2001 | Gan et al. |
| 6,339,053 B1 | 1/2002 | Chivers et al. |
| 6,746,794 B2 | 6/2004 | Mandal et al. |
| 6,841,301 B2 | 1/2005 | Heider et al. |
| 6,853,472 B2 | 2/2005 | Warner et al. |
| 6,902,684 B1 | 6/2005 | Smith et al. |
| 6,919,141 B2 | 7/2005 | Gan et al. |
| 6,939,647 B1 | 9/2005 | Jow et al. |
| 7,169,511 B2 | 1/2007 | Noda et al. |
| 7,202,012 B2 | 4/2007 | Norcini et al. |
| 7,217,480 B2 | 5/2007 | Han et al. |
| 7,316,866 B2 | 1/2008 | Yong et al. |
| 7,341,807 B2 | 3/2008 | Wang et al. |
| 7,479,353 B2 | 1/2009 | Hollenkamp et al. |
| 7,503,942 B2 | 3/2009 | Kurihara et al. |
| 7,582,389 B2 | 9/2009 | Matsui et al. |
| 7,626,804 B2 | 12/2009 | Yoshio et al. |
| 7,651,815 B2 | 1/2010 | Sano et al. |
| 7,713,658 B2 | 5/2010 | Mizuta et al. |
| 7,722,898 B2 | 5/2010 | Bhatt et al. |
| 7,754,388 B2 | 7/2010 | Nakagawa et al. |
| 7,833,661 B2 | 11/2010 | Xiao et al. |
| 7,834,197 B2 | 11/2010 | Nishida et al. |
| 7,854,854 B2 | 12/2010 | Nishida et al. |
| 7,875,732 B2 | 1/2011 | Nishida et al. |
| 7,939,200 B2 | 5/2011 | Ohzuku et al. |
| 7,960,061 B2 | 6/2011 | Jost et al. |
| 7,998,615 B2 | 8/2011 | Matsui et al. |
| 8,034,227 B2 | 10/2011 | Rosvall et al. |
| 8,057,937 B2 | 11/2011 | Sung et al. |
| 8,168,331 B2 | 5/2012 | Best et al. |
| 8,168,334 B2 | 5/2012 | Nakanishi et al. |
| 8,192,863 B2 | 6/2012 | Best et al. |
| 8,211,277 B2 | 7/2012 | Ignatyev et al. |
| 8,227,388 B2 | 7/2012 | Tagawa et al. |
| 8,349,503 B2 | 1/2013 | Saruwatari et al. |
| 8,404,876 B2 | 3/2013 | Sharma et al. |
| 8,597,854 B2 | 12/2013 | Onuma et al. |
| 8,647,780 B2 | 2/2014 | Michot et al. |
| 8,673,499 B2 | 3/2014 | Nakura |
| 8,785,057 B1 | 7/2014 | Smith et al. |
| 8,795,903 B2 | 8/2014 | Smart et al. |
| 8,802,265 B2 | 8/2014 | Noack et al. |
| 8,841,035 B2 | 9/2014 | Choi et al. |
| 8,853,448 B2 | 10/2014 | Sanchez et al. |
| 8,907,209 B2 | 12/2014 | Saito |
| 8,915,975 B2 | 12/2014 | Le Bideau et al. |
| 9,006,457 B2 | 4/2015 | Schmidt et al. |
| 9,012,093 B2 | 4/2015 | Matsumoto et al. |
| 9,034,517 B1 | 5/2015 | Smith et al. |
| 9,059,481 B2 | 6/2015 | He et al. |
| 9,076,996 B2 | 7/2015 | Bradwell et al. |
| 9,079,156 B2 | 7/2015 | Aduri et al. |
| 9,123,972 B2 | 9/2015 | Giroud et al. |
| 9,130,240 B2 | 9/2015 | Rosciano et al. |
| 9,145,341 B2 | 9/2015 | Ein-Eli et al. |
| 9,159,995 B2 | 10/2015 | Ein-Eli et al. |
| 9,172,111 B2 | 10/2015 | Doe et al. |
| 9,177,721 B2 | 11/2015 | Amatucci et al. |
| 9,190,696 B2 | 11/2015 | He et al. |
| 9,196,926 B2 | 11/2015 | Kaneko et al. |
| 9,203,109 B2 | 12/2015 | Hu et al. |
| 9,206,210 B2 | 12/2015 | Gering et al. |
| 9,214,697 B2 | 12/2015 | Kashima et al. |
| 9,231,273 B2 | 1/2016 | Lee et al. |
| 9,293,786 B1 | 3/2016 | Krishnan et al. |
| 9,300,009 B2 | 3/2016 | Sun et al. |
| 9,343,787 B2 | 5/2016 | Takechi et al. |
| 9,362,564 B2 | 6/2016 | Itakura et al. |
| 9,368,831 B2 | 6/2016 | He et al. |
| 9,391,341 B2 | 7/2016 | Sakai et al. |
| 9,397,366 B2 | 7/2016 | Archer et al. |
| 9,431,672 B2 | 8/2016 | Datta et al. |
| 9,458,180 B2 | 10/2016 | Sievert et al. |
| 9,472,831 B2 | 10/2016 | Roschenthaler et al. |
| 9,493,882 B2 | 11/2016 | Bhavaraju et al. |
| 9,514,894 B2 | 12/2016 | Okuno et al. |
| 9,540,312 B2 | 1/2017 | Teran et al. |
| 9,543,616 B2 | 1/2017 | Oh et al. |
| 9,543,617 B2 | 1/2017 | Siret et al. |
| 9,558,894 B2 | 1/2017 | Signorelli et al. |
| 9,564,656 B1 | 2/2017 | Zhamu et al. |
| 9,601,803 B2 | 3/2017 | He et al. |
| 9,601,805 B2 | 3/2017 | He et al. |
| 9,620,820 B2 | 4/2017 | Itakura et al. |
| 9,624,160 B2 | 4/2017 | Schmidt et al. |
| 9,627,713 B2 | 4/2017 | Moganty et al. |
| 9,627,727 B2 | 4/2017 | Takechi et al. |
| 9,666,916 B2 | 5/2017 | Mizuno et al. |
| 9,698,415 B2 | 7/2017 | Takami et al. |
| 9,735,445 B2 | 8/2017 | Zhamu et al. |
| 9,768,469 B2 | 9/2017 | Kim et al. |
| 9,799,881 B2 | 10/2017 | Sankarasubramanian et al. |
| 9,812,736 B2 | 11/2017 | He et al. |
| 9,843,074 B2 | 12/2017 | Röschenthaler et al. |
| 9,843,081 B2 | 12/2017 | Kwon et al. |
| 9,847,180 B2 | 12/2017 | Kaneko et al. |
| 9,856,341 B2 | 1/2018 | Lee et al. |
| 9,884,972 B2 | 2/2018 | Chivers |
| 9,905,856 B1 | 2/2018 | Zhamu et al. |
| 9,917,339 B2 | 3/2018 | Takechi |
| 9,941,559 B2 | 4/2018 | Mizuno et al. |
| 9,966,644 B2 | 5/2018 | Roev et al. |
| 9,979,037 B2 | 5/2018 | Ogata et al. |
| 9,997,806 B2 | 6/2018 | Ito et al. |
| 10,017,866 B2 | 7/2018 | Yoo et al. |
| 10,026,993 B2 | 7/2018 | Srour et al. |
| 10,026,995 B2 | 7/2018 | Zhamu et al. |
| 10,044,031 B2 | 8/2018 | Zhang et al. |
| 10,056,616 B2 | 8/2018 | Teraoka et al. |
| 10,056,645 B2 | 8/2018 | Lee et al. |
| 10,074,874 B2 | 9/2018 | Dubois et al. |
| 10,077,231 B2 | 9/2018 | Teran et al. |
| 10,122,001 B2 | 11/2018 | Elabd et al. |
| 10,122,047 B2 | 11/2018 | Oyama |
| 10,128,541 B2 | 11/2018 | Itakura et al. |
| 10,128,551 B2 | 11/2018 | Roev et al. |
| 10,145,019 B2 | 12/2018 | Bhavaraju et al. |
| 10,158,121 B2 | 12/2018 | Zhamu et al. |
| 10,177,381 B2 | 1/2019 | Fanous et al. |
| 10,227,288 B2 | 3/2019 | Teran et al. |
| 10,236,536 B2 | 3/2019 | Kim et al. |
| 10,290,898 B2 | 5/2019 | Choi et al. |
| 10,297,394 B2 | 5/2019 | Krishnan et al. |
| 10,308,587 B2 | 6/2019 | Teran et al. |
| 10,312,551 B2 | 6/2019 | Zheng et al. |
| 10,340,515 B2 | 7/2019 | De Vries et al. |
| 10,340,524 B2 | 7/2019 | Lee et al. |
| 10,347,904 B2 | 7/2019 | Cho et al. |
| 10,347,938 B2 | 7/2019 | Lee et al. |
| 10,361,456 B2 | 7/2019 | Moon et al. |
| 10,411,302 B2 | 9/2019 | Park et al. |
| 2004/0086782 A1 | 5/2004 | Zhang et al. |
| 2004/0091772 A1 | 5/2004 | Ravdel et al. |
| 2004/0096747 A1 | 5/2004 | Schwake |
| 2004/0218347 A1 | 11/2004 | Schwake |
| 2005/0019670 A1 | 1/2005 | Amine et al. |
| 2005/0031941 A1 | 2/2005 | Zhang et al. |
| 2006/0024577 A1 | 2/2006 | Schwake |
| 2006/0035137 A1 | 2/2006 | Maruo et al. |
| 2006/0128572 A1 | 6/2006 | Lange et al. |
| 2006/0134525 A1 | 6/2006 | Kleijnen et al. |
| 2007/0166591 A1 | 7/2007 | Machida et al. |
| 2007/0238000 A1 | 10/2007 | Koyama et al. |
| 2008/0032173 A1 | 2/2008 | Koyama et al. |
| 2008/0137265 A1 | 6/2008 | Venkateswaran |
| 2008/0138700 A1 | 6/2008 | Horpel et al. |
| 2008/0193853 A1 | 8/2008 | Kim et al. |
| 2009/0169992 A1 | 7/2009 | Ishiko et al. |

(56) References Cited

U.S. PATENT DOCUMENTS

| | | |
|---|---|---|
| 2009/0173381 A1 | 7/2009 | Kang et al. |
| 2009/0286163 A1 | 11/2009 | Shin et al. |
| 2010/0028785 A1 | 2/2010 | Choi et al. |
| 2010/0159338 A1 | 6/2010 | Nakagawa et al. |
| 2010/0178555 A1 | 7/2010 | Best |
| 2010/0209813 A1 | 8/2010 | Onuma et al. |
| 2010/0273063 A1 | 10/2010 | Wallace et al. |
| 2010/0304225 A1 | 12/2010 | Pascaly et al. |
| 2010/0311998 A1 | 12/2010 | De Wolf et al. |
| 2011/0070504 A1 | 3/2011 | Matsumoto et al. |
| 2011/0080689 A1 | 4/2011 | Bielawski et al. |
| 2011/0136018 A1 | 6/2011 | Nogi et al. |
| 2011/0143212 A1 | 6/2011 | Angell et al. |
| 2011/0159379 A1 | 6/2011 | Matsumoto et al. |
| 2011/0206979 A1 | 8/2011 | Giroud et al. |
| 2012/0060360 A1 | 3/2012 | Liu |
| 2012/0082919 A1 | 4/2012 | Onuma et al. |
| 2012/0125422 A1 | 5/2012 | Kang et al. |
| 2012/0244447 A1 | 9/2012 | Suzuki et al. |
| 2013/0025681 A1 | 1/2013 | Kang et al. |
| 2013/0106029 A1 | 5/2013 | Snyder et al. |
| 2013/0164609 A1 | 6/2013 | Ito et al. |
| 2013/0202973 A1 | 8/2013 | Lane et al. |
| 2013/0224609 A1 | 8/2013 | Lee et al. |
| 2013/0269781 A1 | 10/2013 | Ko et al. |
| 2014/0017557 A1 | 1/2014 | Lockett et al. |
| 2014/0017558 A1 | 1/2014 | Lockett et al. |
| 2014/0017571 A1 | 1/2014 | Lockett et al. |
| 2014/0125292 A1 | 5/2014 | Best et al. |
| 2014/0134478 A1 | 5/2014 | Zhao et al. |
| 2014/0186709 A1 | 7/2014 | Iwanaga et al. |
| 2014/0299190 A1 | 10/2014 | Eom et al. |
| 2014/0315096 A1 | 10/2014 | Borges et al. |
| 2014/0349177 A1 | 11/2014 | Chung et al. |
| 2014/0377635 A1* | 12/2014 | Matsumoto ............ H01M 4/133 429/163 |
| 2014/0377644 A1 | 12/2014 | Ishikawa et al. |
| 2015/0194704 A1 | 7/2015 | Garsuch et al. |
| 2015/0287992 A1 | 10/2015 | Osaka et al. |
| 2015/0364794 A1 | 12/2015 | Nakazawa et al. |
| 2016/0013488 A1 | 1/2016 | Kamezaki et al. |
| 2016/0087306 A1 | 3/2016 | Lee et al. |
| 2016/0126590 A1 | 5/2016 | Roberts et al. |
| 2016/0141620 A1 | 5/2016 | Cairns et al. |
| 2016/0141723 A1 | 5/2016 | Nei et al. |
| 2016/0141725 A1 | 5/2016 | Young et al. |
| 2016/0141727 A1 | 5/2016 | Young et al. |
| 2016/0156062 A1 | 6/2016 | Littau et al. |
| 2016/0164080 A1 | 6/2016 | Kim et al. |
| 2016/0164139 A1 | 6/2016 | Ayme-Perrot et al. |
| 2016/0240885 A1 | 8/2016 | Nishimura |
| 2016/0294005 A1 | 10/2016 | Lee et al. |
| 2016/0301107 A1 | 10/2016 | Teran et al. |
| 2016/0319449 A1 | 11/2016 | Izagirre Etxeberria et al. |
| 2016/0336625 A1 | 11/2016 | Jeong et al. |
| 2016/0344035 A1* | 11/2016 | Zhamu ................. H01M 4/628 |
| 2016/0351945 A1 | 12/2016 | Suzuki et al. |
| 2016/0380314 A1 | 12/2016 | Yang et al. |
| 2017/0040642 A1 | 2/2017 | Ito et al. |
| 2017/0062829 A1 | 3/2017 | Ryu et al. |
| 2017/0098858 A1 | 4/2017 | Kim et al. |
| 2017/0125868 A1 | 5/2017 | Kim et al. |
| 2017/0133711 A1 | 5/2017 | Gaben |
| 2017/0133714 A1 | 5/2017 | Ayme-Perrot et al. |
| 2017/0149106 A1 | 5/2017 | Elia et al. |
| 2017/0162911 A1 | 6/2017 | Gaben |
| 2017/0179468 A1 | 6/2017 | Fanous et al. |
| 2017/0187063 A1 | 6/2017 | Pistorino et al. |
| 2017/0194633 A1 | 7/2017 | Schumann et al. |
| 2017/0207448 A1 | 7/2017 | Fanous et al. |
| 2017/0207484 A1 | 7/2017 | Zhamu et al. |
| 2017/0207486 A1 | 7/2017 | Wu et al. |
| 2017/0288269 A1 | 10/2017 | Moganty et al. |
| 2017/0317352 A1 | 11/2017 | Lee et al. |
| 2017/0324097 A1 | 11/2017 | Lee et al. |
| 2017/0330700 A1 | 11/2017 | Tokumaru et al. |
| 2017/0338474 A1 | 11/2017 | Lee et al. |
| 2017/0373311 A1 | 12/2017 | Salehi-Khojin et al. |
| 2018/0000770 A1 | 1/2018 | Novas et al. |
| 2018/0138554 A1 | 5/2018 | Mukherjee et al. |
| 2018/0151887 A1 | 5/2018 | Yang et al. |
| 2018/0183038 A1 | 6/2018 | Yao et al. |
| 2018/0183052 A1 | 6/2018 | Zhamu et al. |
| 2018/0230572 A1 | 8/2018 | Turgis et al. |
| 2018/0269529 A1 | 9/2018 | Yuyama |
| 2018/0277913 A1 | 9/2018 | Pan et al. |
| 2018/0284557 A1 | 10/2018 | Kim |
| 2018/0301756 A1 | 10/2018 | Sakaguchi et al. |
| 2018/0301759 A1 | 10/2018 | Dubois et al. |
| 2018/0309125 A1 | 10/2018 | Beidaghi et al. |
| 2018/0337417 A1 | 11/2018 | Kyu et al. |
| 2018/0337426 A1 | 11/2018 | Matsumoto et al. |
| 2018/0342773 A1 | 11/2018 | Singh et al. |
| 2018/0351196 A1 | 12/2018 | Zhamu et al. |
| 2018/0375156 A1 | 12/2018 | Zhamu et al. |
| 2019/0006651 A1 | 1/2019 | Hamon et al. |
| 2019/0036167 A1 | 1/2019 | Yamaguchi et al. |

FOREIGN PATENT DOCUMENTS

| | | |
|---|---|---|
| CN | 102776053 A | 11/2012 |
| CN | 103374034 A | 10/2013 |
| CN | 103374035 A | 10/2013 |
| CN | 103483381 | 1/2014 |
| CN | 105254667 A | 1/2016 |
| CN | 105283983 | 1/2016 |
| EP | 0168721 | 1/1986 |
| EP | 2920832 | 9/2015 |
| FR | 2753710 | 3/1998 |
| FR | 3040060 | 2/2017 |
| JP | 4537726 | 9/2010 |
| JP | 2012087135 | 5/2012 |
| JP | 5557337 | 7/2014 |
| WO | 2006016733 | 2/2006 |
| WO | 201003008 | 1/2010 |
| WO | 20110178554 | 6/2011 |

OTHER PUBLICATIONS

Karimov et al, Zhumal Obshei Khimii, 1982, v. 53, No. 2, pp. 1181-1185 (1982).

Karimov et al, Zhumal Obshei Khimii, 1982, v. 53, No. 2, pp. 1181-1185 (1982)—Abstract.

Grechkin et al., Izvestiya Akademil Nauk SSSR, Seriya Khimicheskaya (1975), (5), 1202-3 (Abstract—year 1975).

Keglevish, Gyorgy, et al., The Phosphorus Aspects of Green Chemistry: the Use of Quaternary Phosphonium Salts and 1,3-Dialkylimidazolium Hexafluorophosphates in Organic Synthesis, Current Organic Chemistry, 2007, vol. 11, No. 1, pp. 107-126.

Cheng, et al., Improved dye-sensitized solar cells by composite ionic liquid electrolyte incorporating layered titanium phosphate, Solar Energy 84 (2010) pp. 854-859.

Jimenez, Ana Eva, et al., Surface Coating from Phosphonate Ionic Liquid Electrolyte for the Enhancement of the Tribological Performance of Magnesium Alloy, Applied Materials & Interfaces, 2015, 7 (19) pp. 10337-10347.

PCT International Search Report, Form PCT/ISA/210, International Application No. PCT/US17/25464, International Filing Date Mar. 31, 2017, dated Jul. 3, 2017.

Li, Hongyu, et al., Task-specific ionic liquids incorporating alkyl phosphate cations for extraction of U(VI) from nitric acid medium: synthesis, characterization, and extraction performance, J. Radioanal. Nucl. Chem., 2015, vol. 303, pp. 433-440.

Li, Hongyu, et al., Synthesis of pyridine-based task-specific ionic liquid with alkyl phosphate cation and extraction performance for unanyl ion, Ionics, 2015, vol. 21, pp. 2551-2556.

TCI America, Product No. T0460, Product Name Trilauryl trithiophosphite; www.trichemicals.com; printed Dec. 10, 2019.

Mai, Shaowei, et al., Tris(trimethlsilyl)phosphite as electrolyte additive for high voltage layered lithium nickel cobalt manganese

(56) References Cited

OTHER PUBLICATIONS oxide cathode of lithium ion battery, Ecectrochimica Acta, vol. 147, Nov. 20, 2014, pp. 565-571 (abstract provided).

Han, Yount-Kyu, et al., Why is tris(trimethylsilyl) phosphite effective as an additive for high-voltage lithium-ion batteries?, Journal of Materials Chemistry A, Issue 20, 2015 (Abstract provided).

Zhou, Zhenxin, et al., Triphenyl phosphite as an electrolyte additive to improve the cyclic stability of lithium-rich layered oxide cathode for lithium-ion batteries, Electrochima Acta, vol. 216, Oct. 20, 2016, pp. 44-60 (Abstract provided).

Qi, Xin, et al., Lifetime limit of tris(trimethylsilyl) phosphite as electrolyte additive for high voltage lithium ion batteries, RCS Advances, Issue 44, 2016 (Abstract provided).

Pires, Julie, et al., Tris (2,2,2-trifluoroethyl) phosphite as an electrolyte additive for high-voltage lithium-ion batteries using lithium-rich layered oxide cathode, Journal of Power Sources, 296, 2015, pp. 413-425.

\* cited by examiner

PHOSPHORUS CONTAINING ELECTROLYTES

CROSS REFERENCE

This application claims the benefit of the filing date of U.S. Provisional Patent Application Ser. No. 62/533,277, filed Jul. 17, 2017, which is hereby incorporated by reference in its entirety.

FIELD

This disclosure is directed towards phosphorus based thermal runaway inhibiting (TRI) materials, electrolytes containing the materials, and electrical energy storage device containing the electrolytes.

BACKGROUND

Despite the recent progress and improvements in safety of the lithium ion batteries (such as PTC, CID, shutdown separators), chemical shuttles, cathode additives etc. used in portable electronics, there are still safety concerns associated with the high energy density large scale batteries for electric vehicles and consumer applications. Flame retardant additives are added to the electrolyte to prevent or delay the onset of thermal runaway in the battery due mechanical, electrical or thermal abuse.

However, there are still safety challenges such as flammability of lithium-ion batteries under abuse conditions or even normal conditions. U.S. Pat. No. 5,830,600 to Narang et al. and U.S. Pat. No. 8,795,903 to Smart et al. teach the use of flame retardant electrolyte compositions containing select phosphate-based non-aqueous solvents. Therefore, there is a need to incorporate novel multi-functional TRI additives to improve the safety of high energy lithium ion batteries and lithium metal anode batteries.

SUMMARY

This disclosure is directed towards phosphorus based thermal runaway inhibiting (TRI) materials, electrolytes containing the materials, and electrochemical cells containing the electrolytes.

In accordance with one aspect of the present disclosure, there is provided an electrolyte for use in an electrical storage device, the electrolyte includes an aprotic organic solvent, an alkali metal salt, an additive and TRI compound that contains at least one phosphorus moiety.

In accordance with another aspect of the present disclosure, there is provided an electrolyte in an electrical energy storage device, the electrolyte includes an aprotic organic solvent, an alkali metal salt, an additive and a TRI compound that contains at least one phosphorus moiety, wherein the organic solvent is open-chain or cyclic carbonates, carboxylic acid esters, nitrites, ethers, sulfones, sulfoxides, ketones, lactones, dioxolanes, glymes, crown ethers, siloxanes, phosphoric acid esters, phosphates, phosphites, mono- or polyphosphazenes or mixtures thereof.

In accordance with another aspect of the present disclosure, there is provided an electrolyte in an electrical energy storage device, the electrolyte includes an aprotic organic solvent, an alkali metal salt, an additive and the TRI compound that contains at least one phosphorus moiety, wherein the cation of the alkali metal salt is lithium, sodium, aluminum or magnesium.

In accordance with another aspect of the present disclosure, there is provided an electrolyte in an electrical energy storage device, the electrolyte including an aprotic organic solvent, an alkali metal salt, an additive and a TRI compound that contains at least one phosphorus moiety, wherein the additive contains sulfur-containing compounds, phosphorus-containing compounds, boron-containing compounds, silicon-containing compounds, compounds containing at least one unsaturated carbon-carbon bond, carboxylic acid anhydrides or mixtures thereof.

These and other aspects of the present disclosure will become apparent upon a review of the following detailed description and the claims appended thereto.

DETAILED DESCRIPTION

Figure 1:
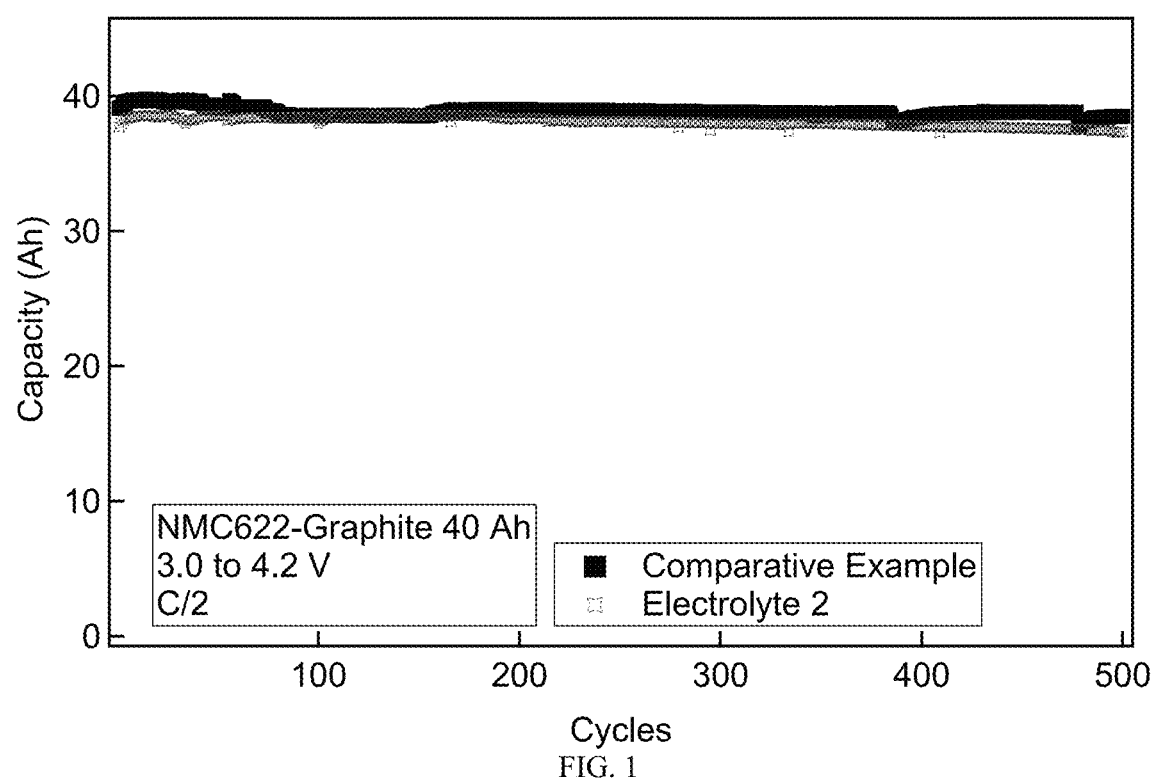
FIG. 1 is a graph of room temperature cycle life comparison between a Comparative Example 0 electrolyte and Electrolyte 2 containing a phosphorus based thermal runaway inhibiting (TRI) materials.

This disclosure is directed phosphorus based thermal runaway inhibiting (TRI) materials, electrolytes containing the materials, and electrochemical cells containing the electrolytes.

In an embodiment, an electrical energy storage device electrolyte includes a) an aprotic organic solvent system; b) an alkali metal salt; and c) a phosphorus based TRI materials.

In an embodiment, an electrical energy storage device electrolyte includes a) an aprotic organic solvent system; b) an alkali metal salt; c) an additive; and d) a phosphorus based TRI materials.

In an embodiment, the molecular structures of a phosphorus based TRI materials are depicted below:

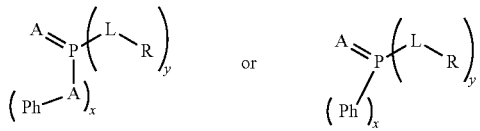

wherein:
  A is oxygen or sulfur;
  Ph is a phenyl group;
  L is oxygen or sulfur;
  x and y are either 1 or 2, but must sum to equal 3;
  R is a phenyl ring with at least one of the hydrogen atoms on the ring substituted with a halogen, methyl, methoxy, silyl, amide, perfluorinated alkyl, silane, sulfoxide, azo, ether or thioether group or combination thereof.

In an embodiment, the phosphorous containing TRI material is present in an amount of from about 0.01 wt. % to about 60 wt. %.

In an embodiment, an electrolyte includes a TRI phosphorus compound, an alkali metal, such as lithium, an additive and an aprotic solvent for use in an electrochemical cell. The ionic liquid contains an organic cation and an inorganic/organic anion, with suitable organic cations including N-alkyl-N-alkyl-pyrrolidinium, N-alkyl-N-alkyl-pyridnium, N-alkyl-N-alkyl-sulfonium, N-alkyl-N-alkyl-ammonium, N-alkyl-N-alkyl-piperdinium or the like, and suitable anions including tetrafluoroborate, hexafluorophosphate, bis(trifluoromethylsulfonyl)imide, bis(pentafluoroethylsulfonyl)imide, trifluoroacetate or the like. The polymer in the electrolyte includes poly(ethylene glycol) derivatives, with varying molecular weights ranging from about 150 g/mol to about 10,000,000 g/mol. Suitable aprotic solvents include carbonates, ethers, acetamides, acetonitrile, symmetric sulfones, 1,3-dioxolanes, dimethoxyethanes, glymes, siloxanes and their blends. The alkali metal salt can be $LiBF_4$, $LiNO_3$, $LiPF_6$, $LiAsF_6$, lithium bis(trifluoromethylsulfonyl)imide (LiTFSI), lithium bis(pentafluoroethylsulfonyl)imide, lithium trifluoroacetate, or a similar compound.

In an embodiment, the electrolyte includes a lithium salt in addition to the ionic liquid. A variety of lithium salts may be used, including, for example, $Li[CF_3CO_2]$; $Li[C_2F_5CO_2]$; $Li[ClO_4]$; $Li[BF_4]$; $Li[AsF_6]$; $Li[PF_6]$; $Li[PF_2(C_2O_4)_2]$; $Li[PF_4C_2O_4]$; $Li[CF_3SO_3]$; $Li[N(CP_3SO_2)_2]$; $Li[C(CF_3SO_2)_3]$; $Li[N(SO_2C_2F_5)_2]$; lithium alkyl fluorophosphates; $Li[B(C_2O_4)_2]$; $Li[BF_2C_2O_4]$; $Li_2[B_{12}Z_{12-j}H_j]$; $Li_2[B_{10}X_{10-j'}H_{j'}]$; or a mixture of any two or more thereof, wherein Z is independent at each occurrence a halogen, j is an integer from 0 to 12 and j' is an integer from 1 to 10.

In an embodiment of the present electrolyte, such as a formulation for a lithium ion battery, aprotic solvents are combined with the present ionic liquids to decrease the viscosity and increase the conductivity of the electrolyte. The most appropriate aprotic solvents lack exchangeable protons, including cyclic carbonic acid esters, linear carbonic acid esters, phosphoric acid esters, oligoether substituted siloxanes/silanes, cyclic ethers, chain ethers, lactone compounds, chain esters, nitrile compounds, amide compounds, sulfone compounds, siloxanes, phosphoric acid esters, phosphates, phosphites, mono- or polyphosphazenes and the like. These solvents may be used singly, or at least two of them in admixture. Examples of aprotic solvents or carriers for forming the electrolyte systems include but are not limited to dimethyl carbonate, ethyl methyl carbonate, diethyl carbonate, methyl propyl carbonate, ethyl propyl carbonate, dipropyl carbonate, bis(trifluoroethyl) carbonate, bis(pentafluoropropyl) carbonate, trifluoroethyl methyl carbonate, pentafluoroethyl methyl carbonate, heptafluoropropyl methyl carbonate, perfluorobutyl methyl carbonate, trifluoroethyl ethyl carbonate, pentafluoroethyl ethyl carbonate, heptafluoropropyl ethyl carbonate, perfluorobutyl ethyl carbonate, etc., fluorinated oligomers, methyl propionate, ethyl propionate, butyl propionate, dimethoxyethane, triglyme, dimethylvinylene carbonate, tetraethyleneglycol, dimethyl ether, polyethylene glycols, triphenyl phosphate, tributyl phosphate, hexafluorocyclotriphosphazene, 2-Ethoxy-2,4,4,6,6-pentafluoro-1,3,5,2-5,4-5,6-5 triazatriphosphinine, triphenyl phosphite, sulfolane, dimethyl sulfoxide, ethyl methyl sulfone, ethylvinyl sulfone, allyl methyl sulfone, divinyl sulfone, fluorophynelmethyl sulfone and gamma-butyrolactone.

In some embodiments, the electrolytes further include an additive to protect the electrodes from degradation. Thus, electrolytes of the present technology may include an additive that is reduced or polymerized on the surface of a negative electrode to form a passivation film on the surface of the negative electrode. Likewise, electrolytes can include an additive that can be oxidized or polymerized on the surface of the positive electrode to form a passivation film on the surface of the positive electrode. In some embodiments, electrolytes of the present technology further include mixtures of the two types of additives.

In some embodiments, an additive is a substituted or unsubstituted linear, branched or cyclic hydrocarbon including at least one oxygen atom and at least one aryl, alkenyl or alkynyl group. The passivating film formed from such additives may also be formed from a substituted aryl compound or a substituted or unsubstituted heteroaryl compound where the additive includes at least one oxygen atom.

Representative additives include glyoxal bis(diallyl acetal), tetra(ethylene glycol) divinyl ether, 1,3,5-triallyl-1,3,5-triazine-2,4,6(1H,3H,5H)-trione, 1,3,5,7-tetravinyl-1,3,5,7-tetramethylcyclotetrasiloxane, 2,4,6-triallyloxy-1,3,5-triazine, 1,3,5-triacryloylhexahydro-1,3,5-triazine, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2-amino-3-vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2-vinyloxetane, 2-vinyloxy-cyclopropanone, 3-(N-vinylamino)cyclohexanone, 3,5-divinyl furoate, 3-vinylazetidin-2-one, 3 vinylaziridin-2-one, 3-vinylcyclobutanone, 3-vinylcyclopentanone, 3-vinyloxaziridine, 3-vinyloxetane, 3-vinylpyrrolidin-2-one, 2-vinyl-1,3-dioxolane, acrolein diethyl acetal, acrolein dimethyl acetal, 4,4-divinyl-3-dioxolan-2-one, 4-vinyltetrahydropyran, 5-vinylpiperidin-3-one, allylglycidyl ether, butadiene monoxide, butyl-vinyl-ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, β-vinyl-γ-butyrolactone or a mixture of any two or more thereof. In some embodiments, the additive may be a cyclotriphosphazene that is substituted with F, alkyloxy, alkenyloxy, aryloxy, methoxy, allyloxy groups or combinations thereof. For example, the additive may be a (divinyl)-(methoxy)(trifluoro)cyclotriphosphazene, (trivinyl)(difluoro)(methoxy)cyclotriphosphazene, (vinyl)(methoxy)(tetrafluoro)cyclotriphosphazene, (aryloxy)(tetrafluoro)(methoxy)cyclotriphosphazene or (diaryloxy)(trifluoro)(methoxy)cyclotriphosphazene compounds or a mixture of two or more such compounds. In some embodiments, the additive is vinyl ethylene carbonate, vinyl carbonate, or 1,2-diphenyl ether, or a mixture of any two or more such compounds.

Other representative additives include compounds with phenyl, naphthyl, anthracenyl, pyrrolyl, oxazolyl, furanyl, indolyl, carbazolyl, imidazolyl, thiophenyl, fluorinated carbonates, sultone, sulfide, anhydride, silane, siloxy, phosphate or phosphite groups. For example, additives may be phenyl trifluoromethyl sulfide, fluoroethylene carbonate, 1,3,2-dioxathiolane 2,2-dioxide, 1-propene 1,3-sultone, 1,3-propanesultone, 1,3-dioxolan-2-one, 4-[(2,2,2-trifluoroethoxy)methyl], 1,3-dioxolan-2-one, 4-[[2,2,2-trifluoro-1-(trifluoromethyl)ethoxy]methyl]-, methyl 2,2,2-trifluoroethyl carbonate, nonafluorohexyltriethoxysilane, octamethyltrisiloxane, methyltris(trimethylsiloxy)silane, tetrakis(trimethylsiloxy)silane, (tridecafluoro-1,1,2,2-tetrahydrooctyl)triethoxysilane, tris(1H,1H-heptafluorobutyl)phosphate, 3,3,3-trifluoropropyltris(3,3,3-trifluoropropyldimethylsiloxy) silane, (3,3,3-trifluoropropyl)trimethoxysilane, trimethylsilyl trifluoromethanesulfonate, tris(trimethylsilyl) borate, tripropyl phosphate, bis(trimethylsilylmethyl)benzylamine, phenyltris(trimethylsiloxy)silane, 1,3-bis(trifluoropropyl)tetramethyldisiloxane, triphenyl phosphate, tris(trimethylsilyl)phosphate, tris(1H,1H,5H-octafluoropentyl) phosphate, triphenyl phosphite, trilauryl trithiophosphite, tris(2,4-di-tert-butylphenyl) phosphite, tri-p-tolyl phosphite, tris(2,2,3,3,3-pentafluoropropyl)phosphate, succinic anhydride, 1,5,2,4-dioxadithiane 2,2,4,4-tetraoxide, tripropyl trithiophosphate, aryloxpyrrole, aryloxy ethylene sulfate, aryloxy pyrazine, aryloxy-carbazole trivinylphosphate, aryloxy-ethyl-2-furoate, aryloxy-o-terphenyl, aryloxy-pyridazine, butyl-aryloxy-ether, divinyl diphenyl ether, (tetrahydrofuran-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinyl-methoxy pyrrole, vinyl-tetrahydrofuran, 2,4-divinyl isooxazole, 3,4 divinyl-1-methyl pyrrole, aryloxyoxetane, aryloxy-phenyl carbonate, aryloxy-piperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxyquinoline, diaryloxycyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene or a mixture of any two or more such compounds.

In an embodiment, the electrolyte of the present technology includes an aprotic gel polymer carrier/solvent. Suitable gel polymer carrier/solvents include polyethers, polyethylene oxides, polyimides, polyphosphazines, polyacrylonitriles, polysiloxanes, polyether grafted polysiloxanes, derivatives of the foregoing, copolymers of the foregoing, cross-linked and network structures of the foregoing, blends of the foregoing and the like, to which is added a suitable ionic electrolyte salt. Other gel-polymer carrier/solvents include those prepared from polymer matrices derived from polypropylene oxides, polysiloxanes, sulfonated polyimides, perfluorinated membranes (Nafion resins), divinyl polyethylene glycols, polyethylene glycol-bis-(methyl acrylates), polyethylene glycol-bis(methyl methacrylates), derivatives of the foregoing, copolymers of the foregoing and cross-linked and network structures of the foregoing.

The phosphorus based TRI materials have high solubility in organic solvents. Electrolyte solutions containing these phosphorous TRI material have high ionic conductivity and are suitable for use as an electrolytic solution for electrochemical devices. Examples of electrochemical devices are electric double-layer capacitor, secondary batteries, solar cells of the pigment sensitizer type, electrochromic devices and condensers, and this list is not limitative. Especially suitable as electrochemical devices are electric double-layer capacitor and secondary batteries, such as a lithium ion battery.

In an embodiment, an electrochemical device is provided that includes a cathode, an anode and an electrolyte including an ionic liquid as described herein. In one embodiment, the electrochemical device is a lithium secondary battery. In some embodiments, the secondary battery is a lithium battery, a lithium-ion battery, a lithium-sulfur battery, a lithium-air battery, a sodium ion battery or a magnesium battery. In some embodiments, the electrochemical device is an electrochemical cell, such as a capacitor. In some embodiments, the capacitor is an asymmetric capacitor or supercapacitor. In some embodiments, the electrochemical cell is a primary cell. In some embodiments, the primary cell is a lithium/$MnO_2$ battery or Li/poly(carbon monofluoride) battery. In some embodiments, the electrochemical cell is a solar cell.

Suitable cathodes include those such as, but not limited to, a lithium metal oxide, spinel, olivine, carbon-coated olivine, $LiFePO_4$, $LiCoO_2$, $LiNiO_2$, $LiNi_{1-x}Co_yMet_zO_2$, $LiMn_{0.5}Ni_{0.5}O_2$, $LiMn_{0.3}Co_{0.3}Ni_{0.3}O_2$, $LiMn_2O_4$, $LiFeO_2$, $Li_{1+x}Ni_\alpha Mn_\beta Co_\gamma Met'_\delta O_{2-z'}F_{z'}$, $A_nB_2(XO_4)_3$ (NASICON), vanadium oxide, lithium peroxide, sulfur, polysulfide, a lithium carbon monofluoride (also known as LiCFx) or mixtures of any two or more thereof, where Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$ and $0 \leq h' \leq 3$. According to some embodiments, the spinel is a spinel manganese oxide with the formula of $Li_{1+x}Mn_{2-z}Met'''_yO_{4-m}X'_n$, wherein Met''' is Al, Mg, Ti, B, Ga, Si, Ni or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$. In other embodiments, the olivine has a formula of $Li_{1+x}Fe_{1-z}Met''_yPO_{4-m}X'_n$, wherein Met'' is Al, Mg, Ti, B, Ga, Si, Ni, Mn or Co; X' is S or F; and wherein $0 \leq x \leq 0.3$, $0 \leq y \leq 0.5$, $0 \leq z \leq 0.5$, $0 \leq m \leq 0.5$ and $0 \leq n \leq 0.5$.

Suitable anodes include those such as lithium metal, graphitic materials, amorphous carbon, $Li_4Ti_5O_{12}$, tin alloys, silicon alloys, intermetallic compounds or mixtures of any two or more such materials. Suitable graphitic materials include natural graphite, artificial graphite, graphitized meso-carbon microbeads (MCMB) and graphite fibers, as well as any amorphous carbon materials. In some embodiments, the anode and cathode are separated from each other by a porous separator.

The separator for the lithium battery often is a microporous polymer film. Examples of polymers for forming films include: nylon, cellulose, nitrocellulose, polysulfone, polyacrylonitrile, polyvinylidene fluoride, polypropylene, polyethylene, polybutene, or co-polymers or blends of any two or more such polymers. In some instances, the separator is an electron beam-treated micro-porous polyolefin separator. The electron treatment can improve the deformation temperature of the separator and can accordingly enhance the high temperature performance of the separator. Additionally, or alternatively, the separator can be a shut-down separator. The shut-down separator can have a trigger temperature above about 130° C. to permit the electrochemical cells to operate at temperatures up to about 130° C.

The disclosure will be further illustrated with reference to the following specific examples. It is understood that these examples are given by way of illustration and are not meant to limit the disclosure or the claims to follow.

Example A

Electrolyte formulations were prepared in a dry argon filled glovebox by combining all the electrolyte components in a vial and stirring for 24 hours to ensure complete dissolution of the salts. The phosphorous based TRI material is added as a co-solvent to a base electrolyte formulation comprising a 3:7 by weight mixture of ethylene carbonate, "EC", and ethyl methyl carbonate, "EMC", with 1 M lithium hexafluorophosphate, "LiPF6", dissolved therein. The electrolyte formulations prepared are summarized in Table A.

TABLE A

Electrolyte formulations.

| Electrolyte | Base | Phosphorous based TRI material Co-solvent (18 wt. %) |
|---|---|---|
| Comparative Example 0 | 1M Li PF6; EC:EMC; 3:7 w/w | NONE |
| 1 | 1.2M Li PF6; EC:EMC; 3:7 w/w | triphenyl phosphate structure |
| 2 | 1.2M Li PF6; EC:EMC; 3:7 w/w | mono-fluorinated triphenyl phosphate structure |
| 3 | 1.2M Li PF6; EC:EMC; 3:7 w/w | di-fluorinated triphenyl phosphate structure |

Example B

The electrolyte formulations prepared are used as the electrolyte in nine 5 Ah Li-ion polymer pouch cells comprising Lithium cobalt oxide cathode active material and graphite as the anode active material. Each electrolyte is filled in three cells. In each cell 14.3 g of electrolyte formulation is added and allowed to soak in the cell for 1 hour prior to vacuum sealing and testing. The cells were then charged to 4.2 V and discharged to 3.0 V at a C/15 rate. The results averages are summarized in Table B.

TABLE B

5Ah Cell initial discharge results. Averages of three.

| Electrolyte | iCL (%) | Discharge Capacity (mAh) |
|---|---|---|
| Comparative Example 0 | 7.8 | 5866 |
| 2 | 7.0 | 5659 |
| 3 | 6.8 | 5686 |

Initial capacity loss, "iCL" is a metric of cell performance measuring how much lithium is consumed during the initial charge-discharge cycle and formation of the solid-electrolyte-interface, "SEI", on the anode surface. It is the aim of cell and electrolyte design for the iCL to be minimized. In this example, the addition of a fluorinated phosphate ester in Electrolyte 2 improves the iCL. Electrolyte 3 provides further improves the iCL with additional fluorination on the phosphate ester. The measured discharge capacities reaching or going above the rated capacity of the cell demonstrate good wetting of the electrodes and separator.

Example C

The electrolyte formulations prepared are used as the electrolyte in nine 200 mAh 403520 Li-ion polymer pouch cells comprising Lithium NMC622 cathode active material and graphite as the anode active material. Each electrolyte is filled in three cells. In each cell 1.1 g of electrolyte formulation is added and allowed to soak in the cell for 1 hour prior to vacuum sealing and testing. The cells were then charged to 4.35 V and discharged to 3.0 V at a C/15 rate. The results averages are summarized in Table C.

TABLE C

5Ah Cell initial discharge results. Averages of three.

| Electrolyte | iCL (%) | Discharge Capacity (mAh) |
|---|---|---|
| Comparative Example 0 | 14.9 | 196 |
| 2 | 14.6 | 183 |
| 3 | 13.9 | 196 |

In this example, the addition of a fluorinated phosphate ester in Electrolyte 2 improves the iCL. Electrolyte 3 provides further improves the iCL with additional fluorination on the phosphate ester. The measured discharge capacities reaching or going above the rated capacity of the cell demonstrate good wetting of the electrodes and separator. The same pattern with respect to incorporating modified phosphates into Li-ion electrolyte formulations is observed independent of cell chemistry.

Example D

The electrolyte formulations prepared are used as the electrolyte in two 40 Ah Li-ion polymer pouch cells comprising Lithium NMC622 cathode active material and graphite as the anode active material. In each cell 170 g of electrolyte formulation is added. The cells are subjected to a wetting procedure where the pressure in increased and decreased repeatedly over the course of 70 minutes. The cells are then vacuum sealed and ready for electrochemical testing after a 10 hour wait period. The cells are then charged to 4.2 V and discharged to 3.0 V at a C/15 rate for formation and then by C/2 discharge and charge for 500 cycles at room temperature. The results of this cycling test are summarized in FIG. 1.

In FIG. 1, it is shown that Electrolyte 2 demonstrates a performance comparable to that of the Comparable Example electrolyte even in large format cells.

Example E

Electrolyte formulations were prepared in a dry argon filled glovebox by combining all the electrolyte components in a vial and stirring for 24 hours to ensure complete dissolution of the salts. The phosphorous based TRI material is added as a cosolvent to a base electrolyte formulation comprising a 3:7 by weight mixture of ethylene carbonate, "EC", and ethyl methyl carbonate, "EMC", with 1 M lithium hexafluorophosphate, "LiPF$_6$", dissolved therein. The electrolyte formulations prepared are summarized in Table E.

TABLE E

Electrolyte formulations.

| Electrolyte | Base | Phosphorous based TRI material Co-solvent (20 wt. %) |
|---|---|---|
| Comparative Example 0 | 1M Li PF6; EC:EMC; 3:7 w/w | NONE |
| 4 | 1.2M Li PF6; EC:EMC; 3:7 w/w | (structure) |
| 5 | 1.2M Li PF6; EC:EMC; 3:7 w/w | (structure) |

TABLE E-continued

Electrolyte formulations.

| Electrolyte | Base | Phosphorous based TRI material Co-solvent (20 wt. %) |
|---|---|---|
| 3 | 1.2M Li PF6; EC:EMC; 3:7 w/w | (structure) |

Example F

The viscosity of the electrolyte formulations were measured at 25.0° C. with a Brookfield Ametek DV2T viscometer attached to a PolyScience Circulating Bath. This experimental set-up allows for viscosity to be measured at a precise temperature. The viscosity results are summarized in Table F.

TABLE F

Viscosities of electrolyte formulations

| Electrolyte | Viscosity at 25.0° C. (cP) |
|---|---|
| Comparative Example 0 | 3.2 |
| 4 | 5.9 |
| 5 | 6.5 |
| 6 | 5.7 |

Viscosity is an important measurement of the transport properties of an electrolyte formulation that influences electrochemical performance. In Table E it is demonstrated that modifying phosphate esters with a single fluorophenyl group instead of two, a lower viscosity electrolyte formulation is achieved. Additionally, using phenyl groups with two fluorines over one achieves an even lower overall viscosity in the electrolyte formulation.

Example G—Synthesis of 4-Fluorophenyl-Diphenyl Phosphate

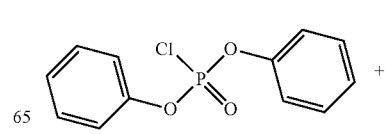

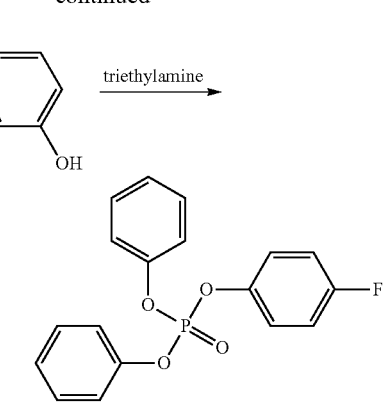

extracted into DCM, separated, dried over MgSO4, filtered and the solvent stripped by rotary evaporation. Yield: pale oil, 615.1 g, (>99%).

The crude oil (>615 g) was slurried in DCM (400 mL) and common silica gel (100 g) for 2 h. The oil was collected by vacuum filtration. The silica gel was washed with DCM (4×100 mL) and the solvent was stripped by rotary evaporation and pumped under high vacuum for 2 h. Yield: pale oil, 603.0 g, (98%).

FTIR: 948, 1176, 1487 cm-1; Karl Fischer: 11.8 ppm; Density=1.4245 g/mL.

H NMR: (CDCl3) δ ppm 7.36-7.20 (m, 12H), 7.02 (t, 2H). F NMR: (CDCl3) δ ppm −116.92(s). P NMR: (CDCl3) δ ppm −17.47(s).

Example H—Nail Penetration Test

Nail penetration tests were conducted on 5 Ah NMC 532-Graphite and LCO-Graphite polymer pouch cells at

| Reagent | MW | Equiv | Mol | Mass (g) | Density | Volume (mL) | Conc | Yield (calc) |
|---|---|---|---|---|---|---|---|---|
| diphenylchlorophosphate | 268.63 | 1.00 | 1.787 | 480.0 | 1.296 | 370.4 | | |
| 4-fluorophenol | 112.10 | 1.00 | 1.787 | 200.3 | | #DIV/0! | | |
| triethylamine | 101.19 | 1.00 | 1.787 | 180.8 | 0.723 | 250.1 | | |
| DCM | | | | 850.4 | 1.326 | 641.3 | 80% | |
| 4-fluorophenyl-DPP | 344.23 | 1.00 | 0.000 | | | | | 615.1 |
| triethylamine-HCl | 137.65 | 1.00 | | | | | | 245.96 |

To a 2 L 3-neck flask equipped with a mechanical stirrer, water-cooled condenser, thermocouple, N2 inlet and addition funnel was dissolved 4-fluorophenol (TCI) in DCM (200 mL). Note: only one-third of the calculated amount of solvent was used in this reaction and only small amounts of solvent were used to rinse residual reagents into the reaction mixture.

Triethylamine was added portionwise and the mixture stirred for 20 min. An exotherm to 39° C. was observed.

While stirring at RT, diphenylchlorophosphate (AK Science) was slowly added by addition funnel over 2 h and an exotherm was observed with a temperature range of 36-55° C. As the reaction proceeded, the pale mixture slowly turned colorless as a white solid ppt (triethylamine-HCl) formed and addition became complete. The mixture slowly returned to RT and stirred for 6 h.

DI water (2×300 mL) was added and the mixture was poured into a separatory funnel. The organic phase was 100% SOC. Table H1 summarizes the electrolyte composition, TRI material molecular structure and corresponding weight percentage in the base electrolyte (EC:EMC 3:7 w/w %) solvents.

Figure 2:
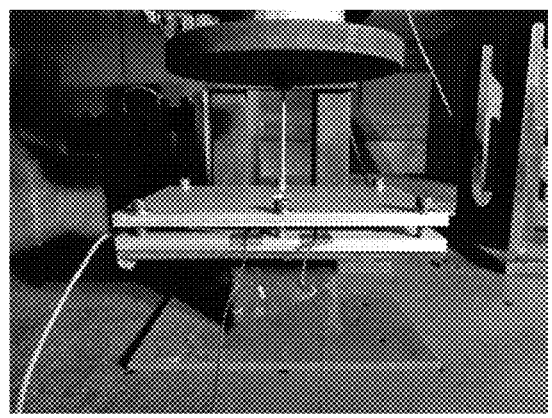
FIG. 2 is a photograph of a nail penetration setup.
Figure 3:
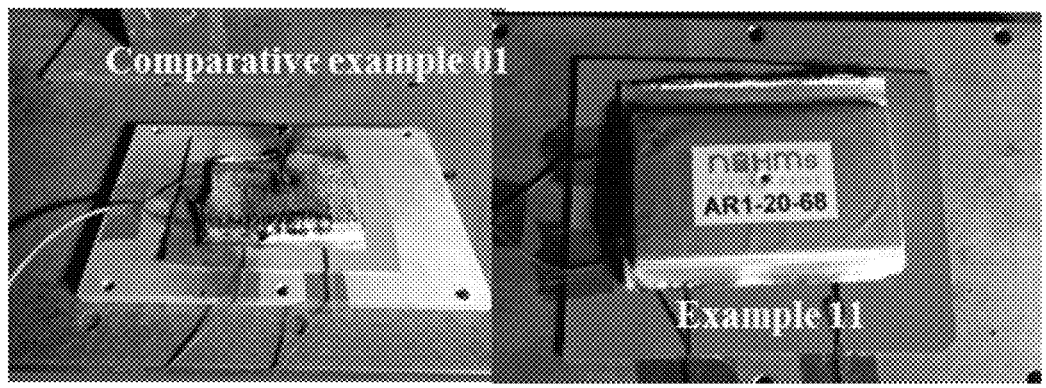
FIG. 3 is a pair of photographs of punctured cells containing commercial electrolyte (EC:EMC 3:7 1M LiPF$_6$) of Comparative Example 01 and electrolyte of Example 11 containing NMC532 pouch cells.

FIG. 2 depicts the nail penetration setup and FIG. 3 depicts photographs of punctured cells. The tests were conducted according USCAR specifications, using a 3 mm sharp nail with a displacement rate of 8 mm/s. The cells were clamped during the test to maintain a consistent stack pressure. The cell skin temperature and voltage were recorded. Peak temperature measured during the nail penetration tests are compared in Table H2. The peak temperature results demonstrate that the electrolyte formulations comprising the phosphorous based TRI material overcome the thermal runaway challenges presented by state of the art electrolyte formulations, as exemplified by the Comparative Examples.

TABLE H1

TRI molecular structure and corresponding weight percentage in the base electrolyte (EC:EMC 3:7 w/w %) solvents

| Electrolyte | Base | TRI and (wt. % in base) |
|---|---|---|
| Comparative Example 01 | 1M Li PF6; EC:EMC; 3:7 w/w | NONE |
| Comparative Example 02 | 1.2M Li PF6; EC:EMC; Ionic liquid Pyr14 TFSI 3:7 w/w (18.5%) | 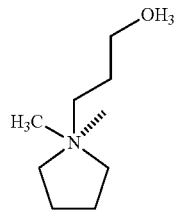 |

TABLE H1-continued

TRI molecular structure and corresponding weight percentage in the base electrolyte (EC:EMC 3:7 w/w %) solvents

| Electrolyte | Base | TRI and (wt. % in base) | |
|---|---|---|---|
| Comparative Example 03 | 1.2M Li PF6; EC:EMC; 3:7 w/w | Cyclophosphazene (18%) | 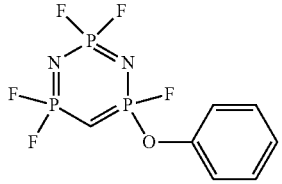 [SMILES: FP1(Oc2ccccc2)=CP(F)(F)=NP(F)(F)=N1] |
| Example 04 | 1.2M Li PF6; EC:EMC; 3:7 w/w | Triphenyl phosphate (TPP) (40%) | 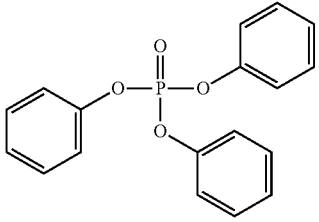 [SMILES: O=P(Oc1ccccc1)(Oc1ccccc1)Oc1ccccc1] |
| Example 11 | 1.2M Li PF6; EC:EMC; 3:7 w/w | 4-Fluoro phenyl di-phenyl phosphate (TPP-F) (40.3%) | 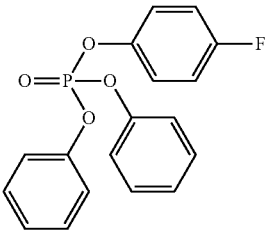 [SMILES: O=P(Oc1ccccc1)(Oc1ccccc1)Oc1ccc(F)cc1] |
| Example 21 | 1.2M Li PF6; EC:EMC; 3:7 w/w | 4-Fluoro phenyl di-phenyl phosphate (TPP-F) (18.3%) | 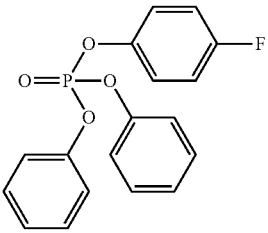 [SMILES: O=P(Oc1ccccc1)(Oc1ccccc1)Oc1ccc(F)cc1] |
| Example 24 | 1.2M Li PF6; EC:EMC; 3:7 w/w | 3,5-Di-fluoro phenyl di-phenyl phosphate (TPP-3,5F) (19.1%) | 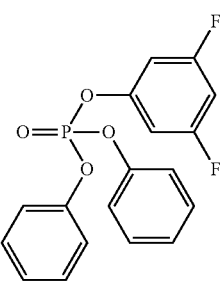 [SMILES: O=P(Oc1ccccc1)(Oc1ccccc1)Oc1cc(F)cc(F)c1] |
| Example 13 | 1.2M Li PF6; EC:EMC; 3:7 w/w | Heptafluoropropyl di-phenyl phosphate (C3F7-DPP) (40.2%) | 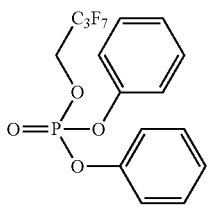 |

TABLE H2

Cell chemistry and capacity and peak temperature measured during the nail penetration tests for variety of TRI compounds.

| Cell Chemistry | Cell Capacity (Ah) | Electrolyte | TRI | TRI wt % | Average Peak T (° C.) |
|---|---|---|---|---|---|
| NMC532-Graphite | 5 | Comparative Electrolyte 01 | None | 0.0 | 593 |
| NMC532-Graphite | 5 | Electrolyte 10 | TPP | 40.6 | 162 |
| NMC532-Graphite | 5 | Electrolyte 11 | TPP-F | 40.3 | 52 |
| LCO-Graphite | 4.8 | Comparative Electrolyte 01 | None | 0.0 | 745 |
| LCO-Graphite | 4.8 | Electrolyte 21 | TPP-F | 18.3 | 69 |
| LCO-Graphite | 4.8 | Comparative Electrolyte 02 | Pyr14 TFSI | 18.5 | 703 |
| LCO-Graphite | 4.8 | Comparative Electrolyte 03 | Cyclophosphazene | 18.0 | 578 |
| LCO-Graphite | 5 | Electrolyte 21 | TPP-F | 18.3 | 100 |
| LCO-Graphite | 5 | Electrolyte 24 | TPP-3,5F | 19.1 | 107 |
| LCO-Graphite | 5 | Electrolyte 13 | C3F7-DPP | 40.2 | 72 |

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed is:

1. An electrical energy storage device electrolyte comprising:
   a) an aprotic organic solvent system;
   b) an alkali metal salt; and
   c) at least one of the following phosphate based compounds in an amount of from 0.01 wt. % to 60 wt. % of the electrolyte

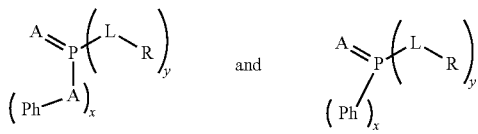

wherein:
A is oxygen or sulfur;
Ph is a phenyl ring;
L is oxygen or sulfur;
x and y are either 1 or 2, but must sum to equal 3;
R is a phenyl ring with at least one of the hydrogen atoms on the ring is substituted with a halogen, alkyl, alkoxy, silyl, sulfoxide, perfluorinated alkyl, silane, sulfoxides, azo, amide, ether or thioether group or combination thereof.

2. The electrolyte of claim 1, wherein the aprotic organic solvent comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixtures thereof.

3. The electrolyte of claim 1, wherein the cation of the alkali metal salt comprises lithium, sodium, aluminum or magnesium.

4. The electrolyte of claim 1, further comprising an additive.

5. The electrolyte of claim 4, wherein the additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof.

6. The electrolyte of claim 1, wherein the additive comprises a concentration in the electrolyte of from about 0.01 wt. % to about 5 wt. %.

7. The electrolyte of claim 1, further comprising an ionic liquid.

8. The electrolyte of claim 7, wherein the ionic liquid comprises an organic cation comprising N-alkyl-N-alkyl-pyrrolidinium, N-alkyl-N-alkyl-pyridnium, N-alkyl-N-alkyl-sulfonium, N-alkyl-N-alkyl-ammonium, or N-alkyl-N-alkyl-piperdinium.

9. The electrolyte of claim 7, wherein the ionic liquid comprises an anion comprising tetrafluoroborate, hexafluorophosphate, bis(trifluoromethylsulfonyl)imide, bis(pentafluoroethylsulfonyl)imide, or trifluoroacetate.

10. An electrical energy storage device comprising:
    a cathode;
    an anode; and
    an electrolyte according to claim 1.

11. The device of claim 10, wherein the cathode comprises a lithium metal oxide, spinel, olivine, carbon-coated olivine, LiFePO$_4$, LiCoO$_2$, LiNiO$_2$, LiNi$_{1-x}$Co$_y$Met$_z$O$_2$, LiMn$_{0.5}$Ni$_{0.5}$O$_2$, LiMn$_{0.3}$Co$_{0.3}$Ni$_{0.3}$O$_2$, LiMn$_2$O$_4$, LiFeO$_2$, Li$_{1+x}$Ni$_\alpha$Mn$_\beta$Co$_\gamma$Met'$_\delta$O$_{2-z}$F$_z$, A$_n$B$_2$(XO$_4$)$_3$ (NASICON), vanadium oxide, lithium peroxide, sulfur, polysulfide, a lithium carbon monofluoride or mixtures of any two or more thereof, where Met is Al, Mg, Ti, B, Ga, Si, Mn or Co; Met' is Mg, Zn, Al, Ga, B, Zr or Ti; A is Li, Ag, Cu, Na, Mn, Fe, Co, Ni, Cu or Zn; B is Ti, V, Cr, Fe or Zr; X is P, S, Si, W or Mo; and wherein $0 \leq x \leq 0.3$, $0 \leq y \leq 0.5$, $0 \leq z \leq 0.5$, $0 \leq x' \leq 0.4$, $0 \leq \alpha \leq 1$, $0 \leq \beta \leq 1$, $0 \leq \gamma \leq 1$, $0 \leq \delta \leq 0.4$, $0 \leq z' \leq 0.4$ and $0 \leq h' \leq 3$.

12. The device of claim 10, wherein the anode comprises lithium metal, graphitic material, amorphous carbon, $Li_4Ti_5O_{12}$, tin alloy, silicon alloy, intermetallic compound or mixtures thereof.

13. The device of claim 10, wherein the device comprises a lithium battery, lithium-ion battery, lithium-sulfur battery, lithium-air battery, sodium ion battery, magnesium battery, electrochemical cell, capacitor, lithium/$MnO_2$ battery, Li/poly(carbon monofluoride) battery, or solar cell.

14. The device of claim 10, further comprising a porous separator separating the anode and cathode from each other.

15. The device of claim 14, wherein the porous separator comprises an electron beam-treated micro-porous polyolefin separator or a microporous polymer film comprising nylon, cellulose, nitrocellulose, polysulfone, polyacrylonitrile, polyvinylidene fluoride, polypropylene, polyethylene, polybutene, or co-polymers or blends of any two or more such polymers.

16. The device of claim 10, wherein the aprotic organic solvent comprises an open-chain or cyclic carbonate, carboxylic acid ester, nitrite, ether, sulfone, ketone, lactone, dioxolane, glyme, crown ether, siloxane, phosphoric acid ester, phosphite, mono- or polyphosphazene or mixtures thereof.

17. The device of claim 10, wherein the cation of the alkali metal salt comprises lithium, sodium, aluminum or magnesium.

18. The device of claim 10, wherein the electrolyte further comprises an additive.

19. The device of claim 18, wherein the additive comprises a sulfur-containing compound, phosphorus-containing compound, boron-containing compound, silicon-containing compound, fluorine-containing compound, nitrogen-containing compound, compound containing at least one unsaturated carbon-carbon bond, carboxylic acid anhydride or the mixtures thereof.

20. The device of claim 10, further comprising an ionic liquid.

21. The device of claim 20, wherein the ionic liquid comprises an organic cation comprising N-alkyl-N-alkyl-pyrrolidinium, N-alkyl-N-alkyl-pyridnium, N-alkyl-N-alkyl-sulfonium, N-alkyl-N-alkyl-ammonium, or N-alkyl-N-alkyl-piperdinium.

22. The device of claim 20, wherein the ionic liquid comprises an anion comprising tetrafluoroborate, hexafluorophosphate, bis(trifluoromethylsulfonyl)imide, bis(pentafluoroethylsulfonyl)imide, or trifluoroacetate.

* * * * *